United States Patent

[11] 3,593,984

| [72] | Inventors | Jerry K. Carman<br>444 S. Monroe St., Xenia, Ohio 45385;<br>Ronald E. Meredith, 4360 Lower Valley<br>Pike, Springfield, Ohio 45506 |
|---|---|---|
| [21] | Appl. No. | 852,763 |
| [22] | Filed | Aug. 25, 1969 |
| [45] | Patented | July 20, 1971 |

[54] WORK-POSITIONING DEVICES
14 Claims, 4 Drawing Figs.

[52] U.S. Cl............................................... 269/71,
77/63 R, 90/DIG. 24, 269/118
[51] Int. Cl........................................................ B23q 1/04
[50] Field of Search.......................................... 269/71, 73,
75, 109, 118, 119, 9, 43, 55, 63, 69, 70; 90/11.3,
DIG. 24; 77/63, 63 F

[56] References Cited
UNITED STATES PATENTS

| 626,427 | 1899 | Jones............................ | 77/63 |
| 1,283,588 | 1918 | Staley........................... | 269/69 X |
| 1,429,575 | 1922 | Fiscus........................... | 269/55 |
| 3,148,873 | 1964 | Chandler....................... | 269/71 |

FOREIGN PATENTS

| 911,731 | 1946 | France ......................... | 77/63 |

*Primary Examiner*—Andrew R. Juhasz
*Assistant Examiner*—James F. Coan
*Attorney*—Elmer Wargo ABSTRACT: A work-positioning device which enables a workpiece supported thereon to be universally accessible to a working tool. First and second pairs of slide units are slidably mounted on a base of the device, and the slide units of each pair are moved towards and away from each other by threaded screws. A work table, to which a workpiece is secured, has locating holes thereon which cooperate with pivot pins and locking pins on each of the slide units, enabling the workpiece to be held in various positions relative to a working tool. A workpiece, like a cube, may have machining work done on its six faces by the tool without being removed from the device.

PATENTED JUL 20 1971

INVENTORS
JERRY K. CARMAN
RONALD E. MEREDITH

BY

Elmer J. Wargo

THEIR ATTORNEY

INVENTORS
JERRY K. CARMAN
RONALD E. MEREDITH

BY Elmer Wargo

THEIR ATTORNEY 3,593,984

WORK-POSITIONING DEVICES

BACKGROUND OF THE INVENTION

This invention relates to a work-positioning device which enables a workpiece supported thereon to be universally accessible to a working tool.

In various machining operations, like drilling and milling operations, for example, it is frequently necessary to relocate the workpiece in a work-supporting means so as to effect a complete machining of the workpiece. This relocating operation is expensive and time-consuming.

Various sophisticated work-supporting means are available for supporting a workpiece in various positions; however, applicants are not aware of any work-positioning device which enables a workpiece to be rotated through 360° about two axes of rotation which are perpendicular to each other.

Applicants' work-positioning device is extremely versatile. If a workpiece like a cube, for example, is to be machined on its six faces, the cube is clamped in applicants' device just once, and all six faces of the cube can be machined without removal of the cube from the work-positioning device. In addition, means are provided for positioning the workpiece so that machining operations at acute angles to its faces may also be effected.

Applicants' work-positioning device can be made in a variety of sizes to accommodate workpieces of various sizes. Because of its relative simplicity, the device can hold accurate tolerances and be inexpensively made. The materials from which applicants' device can be made depend upon strength and tolerance requirements for a particular application, and can be conventionally selected.

SUMMARY OF THE INVENTION

This invention relates to a work-positioning device which enables a workpiece supported thereon to be universally accessible to a working tool. The device includes a base upon which a first pair of slide units is slidably mounted. Fist means are provided for moving the slide units towards and away from each other. A second pair of slide units is also slidably mounted on said base, and second means are included for slidably moving said second pair of slide units in a second plane towards and away from each other. The workpiece to be machined is supported on a work-holding means which has locating means thereon. Each of the slide units of said first and second pairs has pivoting means and locking means thereon. Selected ones of the pivoting means and locking means cooperate with selected ones of the locating means to enable an imaginary line on said work-holding means to be positioned and held in at least three planes mutually perpendicular to one another.

DESCRIPTION OF THE PREFERRED EMBODIMENT

Figure 1:
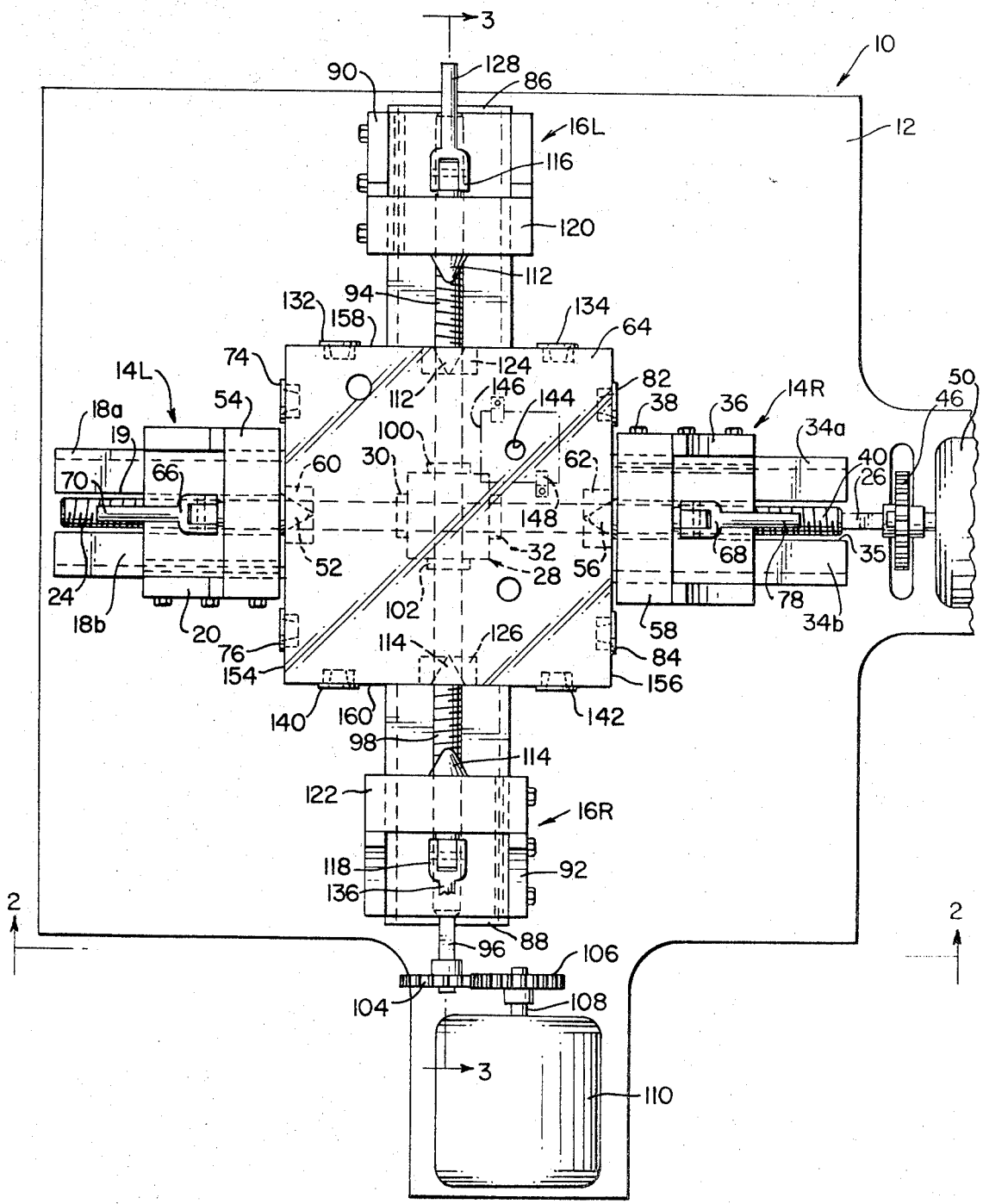
FIG. 1 is a plan view of the work-positioning device of this invention showing the pivoting means of a pair of slide units engaging two locating means on a work-holding means which, for ease of illustration, is shown as a planar table.

FIG. 1 is a plan view of the work-positioning device 10 of this invention, which includes a base 12, which may be supported on a machine (not shown) with which the device 10 is to be used.

The device 10 includes first and second pairs of slide units, which are mounted on the base 12 as follows. The first pair of slide units, designated generally as 14L and 14R, is slidably mounted on the base 12 for movement towards and away from each other in a first plane, which is perpendicular to the plane of the paper of FIG. 1. The second pair of slide units, designated generally as 16L and 16R, is also slidably mounted on the base 12 for movement in a second plane, which is perpendicular to the first plane and perpendicular to the plane of the paper of FIG. 1.

The device 10 includes first means for moving the slide units 14L and 14R towards and away from each other as follows. A conventional dovetail assembly is used to slidably support each of the slide units 14L and 14R. For the slide unit 14L, inner dovetail members 18a and 18b (FIGS. 1, 2, and 3) are secured to the base 12 and cooperate with an outer slide 20, which forms a part of the slide unit. The slide 20 has adjustment screws 22 to make conventional adjustments to the slide unit. The slide 20 has a depending tongue portion (not shown), which fits in the slot 19 between the inner dovetail members 18a and 18b and is internally threaded to receive a threaded section 24 of a shaft 26. The shaft 26 is rotatably supported at its center by a support member (FIG. 1) designated generally as 28, and the shaft has collars 30 and 32 secured thereto, as shown, to prevent axial movement of the shaft relative to the support member 28, which is secured to the base 12.

The slide unit 14R is mounted on the base 12 in a manner similar to that employed in connection with the slide unit 14L and includes inner dovetail members 34a and 34b (FIGS. 1 and 2), which are secured to the base 12. The dovetail members 34a and 34b cooperate with an outer slide 36, which has adjustment screws 38 to make conventional adjustments to the slide unit 14R. The slide 36 has a depending tongue portion (not shown), which fits into a slot 35 between the inner dovetail members 34a and 34b and is internally threaded to receive a threaded section 40 of the shaft 26. The slots 19 and 35 (FIG. 1) provide clearance for the shaft 36 associated with the slide units 14L and 14R. In the embodiment shown, the threaded section 24 has left-hand threads thereon, and the threaded section 40 has right-hand threads thereon. As a consequence, when the shaft 26 is rotated in one direction, the slide units 14R and 14L advance towards each other, and, when the shaft 26 is rotated in the opposite direction, these slide units move away from each other.

Figure 2:
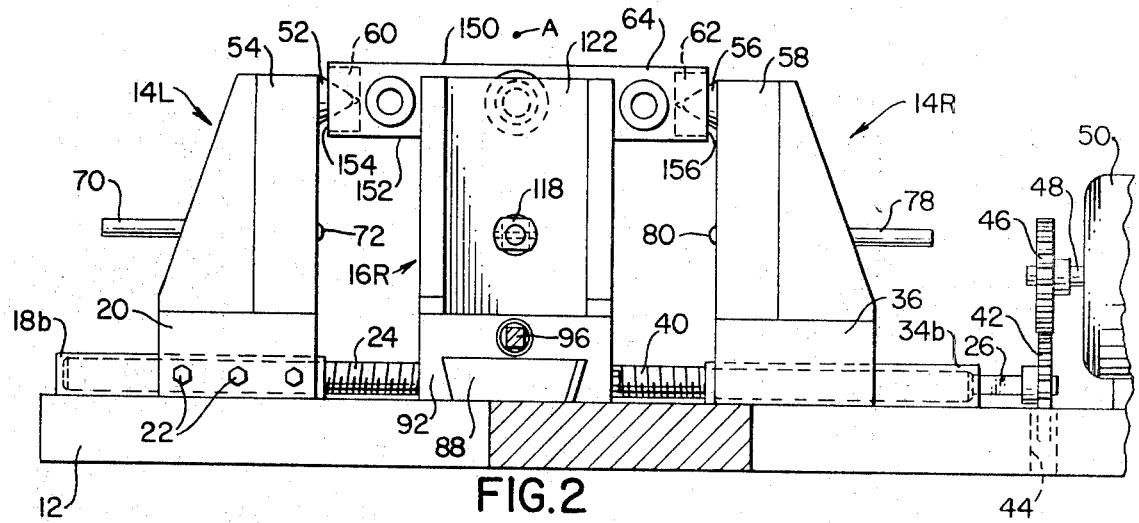
FIG. 2 is a front view in elevation, partly in cross section, taken along the line 2–2 of FIG. 1, showing additional details of the slide unit and means for moving them toward and away from each other.

The means for rotating the shaft 26 in either direction is shown in FIGS. 1 and 2 and includes a gear 42 (FIG. 2), which is fixed to the shaft 26 to rotate therewith. The base 12 is slotted at 44 to provide clearance for the gear 42, which is in mesh with a gear 46, which is fixed to rotate with the output shaft 48 of a bidirectional electric motor 50, which is fixed to the base 12. It is apparent that other conventional means, such as pneumatic motors, may be employed for rotating the shaft 26.

Each of the slide units 14L and 14R of the first pair of slide units has pivoting and locking means thereon, as shown in FIGS. 1 and 2. The pivoting means for the slide unit 14L includes a conical member 52, which is mounted to extend from a vertical support 54, which is fixed to the outer slide 20. Similarly, the slide unit 14R has a conical member 56, which is mounted to extend from a vertical support 58, which is fixed to the outer slide 36. Each of the conical members 52 and 56 has a longitudinal axis which is coincident with the longitudinal axis of the other, and both of these axes lie in the plane of movement of the first pair of slide units towards and away from each other.

When the shaft 26 is rotated in one direction to bring the slide units 14L and 14R together, as shown in FIG. 1, the members 52 and 56, respectively, thereof will engage locating means 60 and 62 of a work-holding means 64. If the slide units 16L and 16R of the second pair of slide units are moved away from each other, as shown in FIG. 1, the work-holding means 64 may be rotated through an angle of 360° about an axis coincident with the longitudinal axes of the conical members 52 and 56.

The locking means for the slide units 14L and 14R are shown in FIGS. 1 and 2 and include plunger means 66 and 68, respectively; these plunger means are conventional spring-loaded plungers. The plunger means 66 includes a handle 70 and a projecting member 72, which is shown in the withdrawn position in FIG. 2. When the handle 70 is moved through an arc of approximately 90°, the projecting member 72 is pushed outwardly of the vertical support 52 to engage either locating means 74 or 76 and lock the work-holding means 64 in the vertical position shown in dashed outline in FIG. 3. The plunger means 68 is similarly constructed and has a handle 78 and a projecting member 80, which cooperates with locating means 82 and 84 (FIG. 1) to lock the work-holding means 64 in the vertical position shown in dashed outline in FIG. 3.

The second pair of slide units (FIGS. 1, 2, and 3) 16L and 16R is constructed in the same general manner as the first pair of slide units 14L and 14R. The slide units 16L and 16R have inner dovetail members 86 and 88, respectively, which are secured to the base 12. The dovetail member 86 cooperates with an outer slide 90 of the slide unit 16L, and, similarly, the dovetail member 88 cooperates with an outer slide 92 on the slide unit 16R. The dovetail member 86 is internally threaded to receive a left-hand, threaded section 94 on a shaft 96, and the dovetail member 88 is internally threaded to receive a right-hand, threaded section 98 on the shaft 96. The shaft 96 is rotatably supported at its center in the support member 28, which has a U-shaped recess to receive the shaft. It is apparent from FIG. 3 that the shaft 96 is mounted above the shaft 26 and at right angles thereto in the support member 28. The shaft 96 is restrained from axial movement relative to the support member 28 by the collars 100 and 102, which are secured to the shaft 96 and are positioned on opposite faces of the support member 28. When the shaft 96 is rotated in one direction, the slide units 16L and 16R are moved towards each other in a second plane (perpendicular to the plane of movement of the first pair of slide units 14L and 14R), and, when the shaft 96 is rotated in the opposite direction, the associated slide units are moved away from each other.

Figure 3:
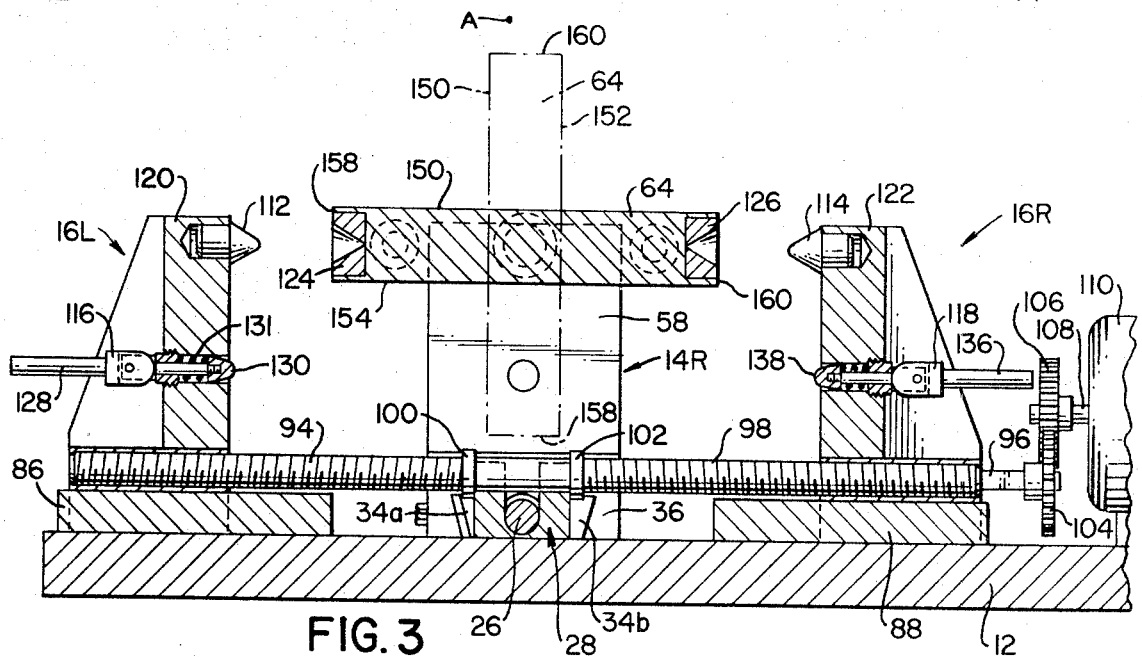
FIG. 3 is a cross-sectional view of the work-positioning device shown in FIG. 1 and is taken along the line 3–3 thereof, showing additional details of a second pair of slide units.

The means for rotating the shaft 96 in either direction is shown in FIGS. 1 and 3 and includes a gear 104, which is fixed to the shaft 96. The gear 104 is meshed with a second gear 106, which is secured to the output shaft 108 of a bidirectional electric motor 110, which is secured to the base 12.

Each of the slide units 16L and 16R of the second pair of slide units has pivoting means and locking means thereon which are identical to their counterparts on the first pair of slide units. The pivoting means for the slide units 16L and 16R (FIGS. 1 and 3) are conical members 112 and 114, which project from their associated vertical supports 120 and 122, respectively. The longitudinal axes of the conical members 112 and 114 are axially aligned and lie in the second plane of movement of the second pair of slide units.

When the shaft 96 (FIG. 3) is rotated in one direction to bring the slide units 16L and 16R together, the associated conical members 112 and 114 will engage, respectively, locating means 124 and 126, located on opposite sides of the work-holding means 64. If the first pair of slide units 14L and 14R are moved away from the work-holding means 64, the work-holding means 64 may be rotated through an angle of 360° about an axis which is coincident with the axes of the conical members 112 and 114.

The plunger means 116 (FIGS. 1 and 3) includes a handle 128 and a projecting member 130, which is shown in the withdrawn position in FIG. 3. When the handle 128 is rotated through an angle of approximately 90°, the projecting member 130 is moved outwardly of the support member 120 by a spring 131 to engage either locating means 132 and 134 when the second pair of slide units 16L and 16R are moved towards each other. The plunger means 118 is identical to the plunger means 116 and includes a handle 136 and a projecting member 138, which cooperates with locating means 140 and 142 to lock the work-supporting means 64 in a position which is perpendicular to the base 12. All of the locating means on the work-supporting means 64 are inserts which have recesses to match the associated conical members and projecting members associated with the pivoting means and locking means, respectively, of the first and second pairs of slide units.

The work-supporting means 64 may be made in a variety of shapes to suit a particular application; however, to simplify the showing thereof, it is shown as a thick square plate. The work-supporting means 64 has a plurality of openings therein, like 144, which may be of various shapes to enable a working tool (not shown) to pass therethrough to reach a workpiece 146 (shown in dashed outline in FIG. 1). The workpiece may be secured to the work-supporting means 64 by any conventional means like toe clamps 148, or the workpiece 146 may be supported in a conventional box fixture (not shown) which is secured to the work-supporting means 64.

The work-positioning device 10 is operated in the following manner. If the slide units 14L and 14R of the first pair are moved toward each other, so that the members 52 and 56 engage their associated locating means 60 and 62 on the work-holding means 64, and the slide units 16L and 16R are similarly moved towards each other, so that the members 112 and 114 engage their associated locating means 124 and 126, respectively, the work-holding means 64 may be fixed in a horizontal position; that is, parallel to the base 12. Assuming that the sides of the work-positioning means 64 are to be positioned relative to a point A (above the base 12, as viewed in FIG. 2) and the sides of the work-holding means 64 are numbered 150, 152, 154, and 156 (FIG. 2) and 158 and 160 (FIGS. 1 and 3), the side 150, as shown in FIG. 2, is positioned relative to the point A. To position the opposite side 152 (FIG. 2) relative to the point A, either the first pair or the second pair of slide units is moved away from the work support means 64, and the support means 64 is rotated through 180° to position the opposite side 152 adjacent to the point A. It is apparent that the work support means 64 must be pivoted, using one pair of slide units, while the other pair is withdrawn from engagement with the work support means 64. To move the side 160 from the position shown in solid lines in FIG. 3 to the position shown in dashed lines in FIG. 3, the second pair of slide units 16L and 16R would be positioned away from the work support means 64, as shown, and the work support means 64 would be pivoted about the conical members 52 and 56 to the position shown. The projecting members 72 and 80 of the first slide units would then be actuated to bring them into engagement with the locating means 74 and 82, respectively, to lock the work support means 64 in the dashed line position shown in FIG. 3. By employing this general technique of pivoting and locking, it is apparent that an imaginary line perpendicular to one of the sides of the work-holding means 64 may be positioned in three planes which are mutually perpendicular to one another and a workpiece held on the work-supporting means 64 may be worked on from six directions.

Figure 4:
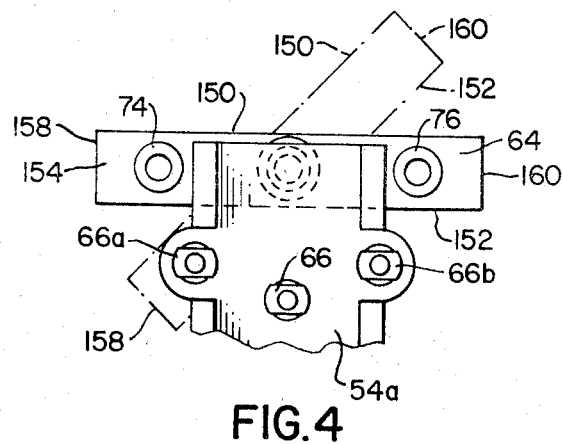
FIG. 4 is an elevational view of a modified form of a slide unit of the work-positioning device, which may be used to increase its versatility.

To provide additional versatility to the device 10, the slide units of the first and second pairs of slide units may be altered, as shown in FIG. 4, to provide intermediate positioning points. For example, the side 150 may be positioned at an acute angle, like 45°, 60°, etc., by providing additional locking means on the slide units. A typical slide unit like the slide unit 14L (FIG. 1) would be altered as shown in FIG. 4 by extending the vertical support 54a and mounting two additional plunger means 66a and 66b thereon. The axes of the plunger means 66a, 66b, and 66 are located on an arc which also passes through the axes of the locating means 77 and 76.

What we claim is:
1. A work-positioning device comprising:
   a base;
   a first pair of slide units slidably mounted on said base;
   first means for moving said slide units in a first plane towards and away from each other;
   a second pair of slide units slidably mounted on said base;
   second means for moving said second pair of slide units in a second plane towards and away from each other;
   a work-holding means having locating means thereon; and
   each of said slide units having pivoting means and locking means thereon;

selected ones of said pivoting means and locking means cooperating with selected ones of said locating means to enable an imaginary line on said work-holding means to be positioned in three planes mutually perpendicular to one another.

2. The device as claimed in claim 1 in which the pivoting means associated with the slide units of said first pair have longitudinal axes which are axially aligned and which axes lie in said first plane.

3. The device as claimed in claim 2 in which the pivoting means associated with the slide units of said second pair have longitudinal axes which are axially aligned and which axes lie in said second plane, and in which extensions of the longitudinal axes of said first and second pairs intersect at a common point.

4. The device as claimed in claim 3 in which the pivoting means of said first ans second pairs of slide units cooperate with selected ones of said locating means to hold said work-holding means in a fixed position relative to said base.

5. The device as claimed in claim 4 in which said pivoting means of said first and second pairs of slide units are conically shaped members projecting from the associated said slide units and said locating means include bushings having recesses complementary to said conically shaped members.

6. The device as claimed in claim 3 in which said first means for moving said first pair of slide units includes a first shaft member having right-hand and left-hand threaded sections on opposite ends thereof, with said right-hand threaded section being threadedly connected to one of the slide units of the first pair and the left-hand threaded section being threadedly connected to the remaining one of said slide units of the first pair; means for rotating said first shaft means in either direction; and restraining means to prevent axial movement of said first shaft member as it is rotated.

7. The device as claimed in claim 6 in which said second means for moving said second pair of slide units is identical to said first means and includes a second shaft member, whose longitudinal axis lies in said second plane.

8. The device as claimed in claim 1 in which said work-holding means is adapted to be rotated through 360° when said work-holding means is supported on the pivoting means of said first pair of slide units and the pivoting means of said second pair of slide units is moved away from said work-holding means by said second means.

9. The device as claimed in claim 1 in which said work-holding means has working apertures passing therethrough, and work-clamping means thereon to enable a workpiece which may be attached thereto to be worked upon from directions 180° apart.

10. The device as claimed in claim 8 in which said locking means for each said slide unit includes a plunger means adapted to be withdrawn into the associated slide unit to an inoperative position therein, and adapted to extend therefrom to an operative position, where it engages a selected locating means on said work-holding means to fix said work-holding means relative to said base.

11. The device as claimed in claim 10 in which the plunger means of said first pair of slide units have longitudinal axes which lie in said first plane.

12. The device as claimed in claim 10 in which the locating means on said work-holding means have longitudinal axes which lie in a common plane.

13. The device as claimed in claim 12 in which said locking means for each said slide unit also include second plunger means located outside said first and second planes and adapted to cooperate with selected ones of said locating means to position said imaginary line at acute angles to said three planes mutually perpendicular to one another.

14. The device as claimed in claim 13 in which said work-holding means is quadrilaterally shaped, having four edges which are perpendicular to a reference plane, and in which said locating means are positioned in said four edges.